(12) United States Patent
Hui et al.

(10) Patent No.: US 10,339,456 B2
(45) Date of Patent: Jul. 2, 2019

(54) MACHINE LEARNING-BASED TROUBLESHOOTING OF VOLTE CALLS

(71) Applicant: T-Mobile USA, Inc., Bellevue, WA (US)

(72) Inventors: Jie Hui, Mercer Island, WA (US); Yunhan Jia, Ann Arbor, MI (US); Yihua Guo, Ann Arbor, MI (US); Alex Yoon, Sammamish, WA (US); Antoine Tran, Bellevue, WA (US); Kranthi Sontineni, Renton, WA (US); Z. Morley Mao, Ann Arbor, MI (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/586,451

(22) Filed: May 4, 2017

(65) Prior Publication Data

US 2018/0192303 A1 Jul. 5, 2018

Related U.S. Application Data

(60) Provisional application No. 62/442,879, filed on Jan. 5, 2017.

(51) Int. Cl.
*G06N 5/04* (2006.01)
*H04W 24/04* (2009.01)
(Continued)

(52) U.S. Cl.
CPC .............. *G06N 5/04* (2013.01); *G06N 20/00* (2019.01); *H04L 65/1016* (2013.01);
(Continued)

(58) Field of Classification Search
CPC ........ H04W 24/02; H04W 24/08; G06N 5/04; G06N 99/005; H04M 3/2227; H04M 3/2218; H04L 65/1016
See application file for complete search history.

(56) References Cited

U.S. PATENT DOCUMENTS

2016/0112894 A1* 4/2016 Lau ................. H04W 24/10
370/252
2017/0214790 A1* 7/2017 Sun ................. H04M 3/2218

OTHER PUBLICATIONS

V Nikravesh, H. Yao, S. Xu, D. Choffnes, and Z. M. Mao. Mobilyzer: An open platform for controllable mobile network neasurements. In ACM Mobisys, 2015.*

(Continued)

*Primary Examiner* — Andrew Lai
*Assistant Examiner* — Harry H Kim
(74) *Attorney, Agent, or Firm* — Han Santos, PLLC (57) ABSTRACT

A VoLTE diagnostic engine may receive VoLTE call records of VoLTE calls that are carried by a wireless carrier network for multiple user devices. The VoLTE call records may include performance indicators and call features for the voice calls. Each call feature of a VoLTE call may represent a circumstance under which the VoLTE call is established and ended. The VoLTE diagnostic engine may apply a decision tree to the VoLTE call records to identify critical features of one or more call conditions that lead to Quality of Experience (QoE) problems for the VoLTE calls captured in the VoLTE call records. Each call condition may include a subset of the call features. Further, the VoLTE diagnostic engine may apply a classifier on the critical features to determine a root cause of a QoE problem for at least one call conditions.

20 Claims, 7 Drawing Sheets

(51) Int. Cl.
H04M 3/22 (2006.01)
G06N 99/00 (2010.01)
H04L 29/06 (2006.01)
G06N 20/00 (2019.01)

(52) U.S. Cl.
CPC .......... *H04L 65/80* (2013.01); *H04M 3/2227* (2013.01); *H04M 3/2236* (2013.01); *H04W 24/04* (2013.01); *H04M 2207/185* (2013.01)

(56) References Cited

OTHER PUBLICATIONS

\pache Spark. Lightning-Fast Unified Analytics Engine. Apache Spark [online], [retrieved on Jan. 31, 2019]. Retrieved rom the Internet <http://spark.apache.org/>.*
Peng, C.-Y. Li, H. Wang, G.-H. Tu, and S. Lu. Real threats to your data bills: Security loopholes and defenses in nobile data charging. In Proceedings of the 2014 ACM SIGSAC Conference on Computer and Communications Security, pp. 727-738. ACM, 2014.*
H. Tu, C. Peng, H. Wang, C.-Y. Li, and S. Lu. How voice calls affect data in operational lte networks. In 3roceedings of the 19th annual international conference on Mobile computing & networking, pp. 87-98. ACM, 2013.*
H. Tu, Y. Li, C. Peng, C.-Y. Li, H. Wang, and S. Lu. Control-plane protocol interactions in cellular networks. In ACM 5IGCOMM Computer Communication Review, vol. 44, pp. 223-234. ACM, 2014.*
Kallio, T. Jalkanen, and J. T. Penttinen. Voice over lte. The LTE/SAE Deployment Handbook, pp. 157-187, 2012.*
Morris, Anne. GSA: VoLTE deployments reach 40 worldwide. FierceWireless, 2019 [online], [retrieved on Jan. 31, 2019]. Retrieved from the Internet <https://www.fiercewireless.com/europe/gsa-volte-deployments-reach-40-worldwide>.*
Rosen, H. Luo, Q. A. Chen, Z. M. Mao, J. Hui, A. Drake, and K. Lau. Discovering Fine-grained RRC State Dynamics and Performance Impacts in Cellular Networks. In ACM MobiCom, 2014.*
Rosen, H. Luo, Q. A. Chen, Z. M. Mao, J. Hui, A. Drake, and K. Lau. Understanding RRCC State Dynamics through Client Measurements with Mobilyzer. In ACM MobiCom S3 Workshop, 2014.*
»cikit-learn. Machine Learning in Python, scikit-learn [online], [retrieved on Jan. 31, 2019], Retrieved from the Internet <http://scikit-learn.org/stable/>.*
Li, C. Peng, Z. Yuan, J. Li, H. Deng, and T. Wang. Mobileinsight: Extracting and analyzing cellular network nformation on smartphones. In ACM Mobicom, 2016.*
Li, H. Deng, J. Li, C. Peng, and S. Lu. Instability in distributed mobility management: Revisiting configuration nanagennent in 3g/4g mobile networks. In Proceedings of the 2016 ACM SIGMETRICS International Conference on Measurement and Modeling of Computer Science, pp. 261-272. ACM, 2016.*
Li, J. Xu, C. Peng, and S. Lu. A first look at unstable mobility management in cellular networks. In Proceedings of he 17th International Workshop on Mobile Computing Systems and Applications, pp. 15-20. ACM, 2016.*
G.-H. Tu, C.-Y. Li, C. Peng, Z. Yuan, Y. Li, X. Zhao, and S. Lu. Volte: A Lightweight Voice Solution to 4G LTE Networks. In Proceedings of the 17th International Workshop on Mobile Computing Systems and Applications, pp. 3-8. ACM, 2016.

J. Jiang, R. Das, G. Ananthanarayanan, P. A. Chou, V. Padmanabhan, V. Sekar, E. Dominique, M. Goliszewski, D. Kukoleca, R. Vafin, et al. Via: Improving Internet Telephony Call Quality Using Predictive Relay Selection. In Proceedings of the 2016 conference on ACM SIGCOMM 2016 Conference, pp. 286-299. ACM, 2016.
J. Jiang, V. Sekar, H. Milner, D. Shepherd, I. Stoica, and H. Zhang. CFA: A Practical Prediction System for Video QOE Optimization. In 13th USENIX Symposium on Networked Systems Design and Implementation (NSDI 16), pp. 137-150, 2016.
T.-Y. Huang, K.-T. Chen, and P. Huang. Tuning Skype's Redundancy Control Algorithm for User Satisfaction. In INFOCOM 2009, IEEE, pp. 1179-1187. IEEE, 2009.
T.-Y. Huang, P. Huang, K-T. Chen, and P.-J. Wang. Could Skype be More Satisfying? A Qoe-centric Study of the FEC Mechanism in an Internet-Scale VOIP System. Network, IEEE, 24(2):42-48, 2010.
Y. J. Jia, Q. A. Chen, Z. M. Mao, J. Hui, K. Sontinei, A. Yoon, S. Kwong, and K. Lau. Performance Characterization and Call Reliability Diagnosis Support for Voice over LTE. In Proceedings of the 21st Annual International Conference on Mobile Computing and Networking, pp. 452-463. ACM, 2015.
A. Nikravesh, H. Yao, S. Xu, D. Choffnes, and Z. M. Mao. Mobilyzer: An open platform for controllable mobile network measurements. In ACM Mobisys, 2015.
Apache Spark. Lightning-Fast Unified Analytics Engine. Apache Spark [online], [retrieved on Jan. 31, 2019]. Retrieved from the Internet <http://spark.apache.org/>.
C. Peng, C.-Y. Li, H. Wang, G.-H. Tu, and S. Lu. Real threats to your data bills: Security loopholes and defenses in mobile data charging. In Proceedings of the 2014 ACM SIGSAC Conference on Computer and Communications Security, pp. 727-738. ACM, 2014.
G.-H. Tu, C. Peng, H. Wang, C.-Y. Li, and S. Lu. How voice calls affect data in operational lte networks. In Proceedings of the 19th annual international conference on Mobile computing & networking, pp. 87-98, ACM, 2013.
G.-H. Tu, Y. Li, C. Peng, C.-Y. Li, H. Wang, and S. Lu. Control-plane protocol interactions in cellular networks. In ACM SIGCOMM Computer Communication Review, vol. 44, pp. 223-234. ACM, 2014.
J. Kallio, T. Jalkanen, and J. T. Penttinen. Voice over lte. The LTE/SAE Deployment Handbook, pp. 157-187,2012.
S. Rosen, H. Luo, Q. A. Chen, Z. M. Mao, J. Hui, A. Drake, and K. Lau. Discovering Fine-grained RRC State Dynamics and Performance Impacts in Cellular Networks. In ACM MobiCom, 2014.
S. Rosen, H. Luo, Q. A. Chen, Z. M. Mao, J. Hui, A. Drake, and K. Lau. Understanding RRC State Dynamics through Client Measurements with Mobilyzer. In ACM MobiCom S3 Workshop, 2014.
scikit-team. Machine Learning in Python. scikit-learn [online], [retrieved on Jan. 31, 2019]. Retrieved from the Internet <http://scikit-learn.org/stable/>.
Y. Li, C. Peng, Z. Yuan, J. Li, H. Deng, and T. Wang. Mobileinsight: Extracting and analyzing cellular network information on smartphones. In ACM Mobicom, 2016.
Y. Li, H. Deng, J. Li, C. Peng, and S. Lu. Instability in distributed mobility management: Revisiting configuration management in 3g/4g mobile networks. In Proceedings of the 2016 ACM SIGMETRICS International Conference on Measurement and Modeling of Computer Science, pp. 261-272. ACM, 2016.
Y. Li, J. Xu, C. Peng, and S. Lu. A first look at unstable mobility management in cellular networks. In Proceedings of the 17th International Workshop on Mobile Computing Systems and Applications, pp. 15-20. ACM, 2016.

* cited by examiner

MACHINE LEARNING-BASED TROUBLESHOOTING OF VOLTE CALLS

CROSS REFERENCE TO RELATED PATENT APPLICATION

This application claims priority to U.S. Provisional Patent Application No. 62/442,879, filed on Jan. 5, 2017, entitled "Machine Learning-based Troubleshooting of VoLTE Calls," which is hereby incorporated by reference in its entirety.

BACKGROUND

Wireless communication devices are integral to the daily lives of most users. Wireless communication devices are used to make voice calls, check email and text messages, update social media pages, stream media, browse websites, and so forth. Thus, users of wireless communication devices expect telecommunication carriers to provide constant and reliable telecommunication and data communication service at all times.

Many wireless communication carriers have deployed Voice over LTE (VoLTE) services, which provide higher quality of experience (QoE) to customers than voice communication services that are routed through legacy 3G wireless communication networks. However, VoLTE services may experience certain types of QoE problems, such as high unintended call drop rate, unintentional muting of calls, call connect failure, and/or so forth. Diagnosing QoE problems may be challenging due to the difficulty of determining the root cause of the QoE problems. Metrics such as call drop rate and call setup time may provide some insight, but do not provide visibility on actual user experience with the audio quality of VoLTE calls. Methods such as using rating scales to obtain user feedbacks on the QoE for VoLTE calls may not capture all QoE data. Further, such feedbacks may be delayed due to the time used by the users to manually input the feedback, and the feedbacks may be biased due to insufficient sample size.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques that use machine learning to diagnose the root causes of QoE problems for VoLTE calls, and generating responses for resolving the QoE problems. The techniques leverage performance monitoring software that are implemented on user devices to collect performance indicators from multiple device architectural layers of each of the user devices, such as the radio link layer and the application layer. The performance indicators may include user interface (UI) interaction messages, IMS message transaction data, call setting data, call state data, Real-time Transport Protocol (RTP) performance data, call handover data, and/or so forth.

The performance indicators that are collected by the performance monitoring software of the user devices may be uploaded to a VoLTE diagnostic engine that is operated by a wireless telecommunication carrier. The VoLTE diagnostic engine may extract the characteristics of various QoE problems and build new QoE metrics. The critical features of each QoE metric are then determined by the VoLTE diagnostic engine in order to diagnose the root causes of the corresponding QoE problems. Subsequently, the VoLTE diagnostic engine may generate responses for resolving the QoE problems based on the identified root causes. The responses may include suggestions of measures or actions to be implemented by the wireless network operators, protocol designers, and/or device manufacturers.

In various embodiments, the VoLTE diagnostic engine may receive VoLTE call records of VoLTE calls that are carried by a wireless carrier network for multiple user devices. The VoLTE call records may include performance indicators and call features for the voice calls. Each call feature of a VoLTE call may represent a circumstance under which the VoLTE call is established and ended. The VoLTE diagnostic engine may apply a decision tree to the VoLTE call records to identify critical features of one or more call conditions that lead to Quality of Experience (QoE) problems for the VoLTE calls captured in the VoLTE call records. Each call condition may include a subset of the call features. Further, the VoLTE diagnostic engine may apply a classifier on the critical features to determine a root cause of a QoE problem for a VoLTE call that has a call condition.

The techniques enable a telecommunication carrier to overcome several challenges that are present with diagnosing the root cause of QoE problems for VoLTE calls. The performance of a VoLTE call may be dependent on the deployment of the LTE network, the network infrastructure of the LTE network, the process of making the VoLTE call, coverage level at a particular geolocation, congestion level at the particular geolocation, control plane issues, and/or so forth. Such complex network architecture and life cycle of the LTE call means that multiple factors must be consider in determining the root cause of QoE problems. Further, the multi-layer nature of VoLTE service on the user devices means that there are interdependences between the multiple factors. Accordingly, the proper diagnosis of the root cause for VoLTE QoE problems is virtually impossible without the use of machine-learning tools.

The ability to efficiently pinpoint root causes of QoE problems for VoLTE calls using machine-learning tools may enable the telecommunication carrier to remedy the QoE problems before the QoE problems become more disruptive or widespread. Thus, the techniques may alleviate expenses incurred by customer support centers in taking in outage reports, as well as reduce technical troubleshooting time and complexity experienced by network engineers. The techniques described herein may be implemented in a number of ways. Example implementations are provided below with reference to the following figures.

Example Network Architecture

Figure 1:
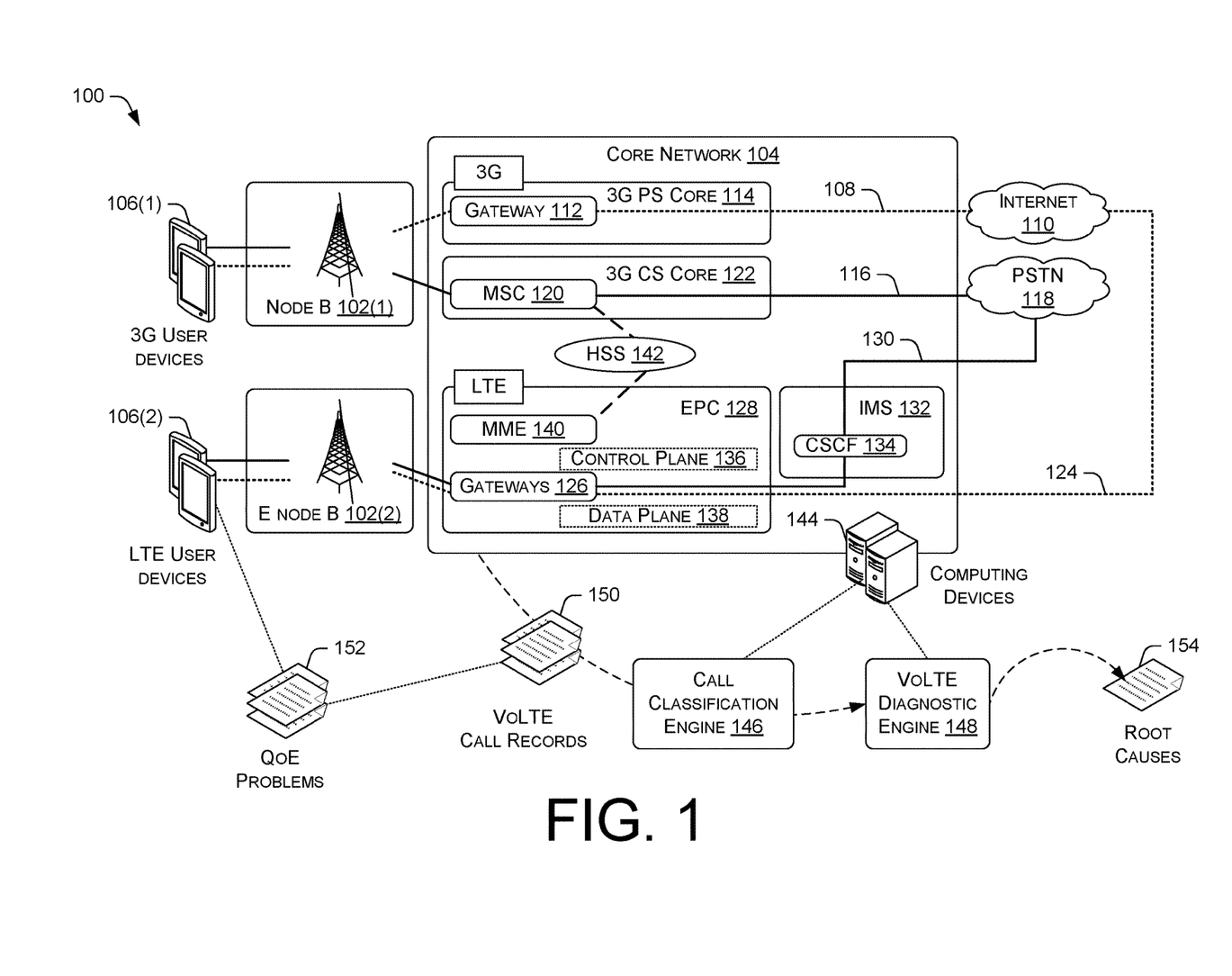
FIG. 1 illustrates an example wireless carrier network architecture for implementing machine learning-based troubleshooting of VoLTE calls.

FIG. 1 illustrates an example network architecture of a wireless carrier network for implementing machine learning-based troubleshooting of VoLTE calls. The wireless carrier network may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth.

The network architecture 100 of a wireless carrier network may include base station nodes, such as the base station nodes 102(1) and 102(2), and a core network 104. The base station nodes 102(1) and 102(2) are responsible handling voice and data traffic between user devices and the core network 104 via air interfaces. The core network 104 may provide telecommunication and data communication services to multiple user devices, such as a 3G-compatible user device 106(1) and a LTE-compatible user device 106(2). The user devices 106(1) and 106(2) may include a smartphone, a tablet computer, an embedded computer system, or any other device that is capable of using the wireless communication services that are provided by the wireless carrier network. The core network 104 may include 3G domain components that support 3G data traffic and 3G voice traffic. For example, 3G data traffic 108 between the 3G-compatible user device 106(1) and the Internet 110 that are handled by the base station node 102(1) may be routed through a gateway 112 of a 3G Packet Switch (PS) Core 114. On the other hand, 3G voice traffic 116 between the 3G-compatible user device 106(1) and the Public Switched Telephone Network (PSTN) 118 that are handed by the base station node 102(1) may be routed through a Mobile Switch (MSC) 120 of the 3G Circuit Switch (CS) core 122.

The core network 104 may further include LTE-domain components that support LTE data voice and LTE data traffic. For example, LTE data traffic 124 between the LTE-compatible user device 106(2) and the Internet 110 may be routed through one or more gateways 126 of the Evolved Packet Core (EPC) 128. On the other hand, VoLTE enables the transmission of voice call over the LTE-domain of the core network 104. For example, the base station node 102(2) may further handle voice traffic 130 of the VoLTE calls for the LTE-compatible user device 106(2). In turn, the base station node 102(2) may route the voice traffic 130 be routed through IP multimedia Subsystem (IMS) core 132 that is controlled by Call Session Control Functions (CSCF) 134. During a VoLTE call, the EPC 128 may maintain a control session in a control plane 136 and a data session in a data plane 138. Accordingly, the signaling messages to initiate call may flow over the control plane 136, and the EPC 128 may use Session Initiation Protocol (SIP) to control the VoLTE call.

The voice packets for the VoLTE call may be encoded with Adaptive Multi-Rate wideband (AMR-WB) codec and are transmitted with Real-time Transport (RTP) protocol over the data plane 138. In some instances, the IMS core 132 may route a VoLTE call to the PSTN 118. The Mobility Management Entity (MME) 140 of the EPC 128 handles paging, authentication, and registration of LTE-compatible user devices with the EPC 128, as well as the routing of data communications and VoLTE calls through selected gateways of the gateways 126. Accordingly, both the MME 140 and the MSC 120 may access subscriber information that is stored in the Home Subscriber Server (HSS) 142 to perform their functions.

The VoLTE calls may have improved voice quality in comparison to 3G voice calls as VoLTE calls are carried by dedicated bearers with guaranteed Quality of Service (QoS). A bearer is a pipeline for transporting data among a user device, a base station, gateways, and other entities. In contrast, 3G voice calls are generally carried by default bearers that do no guarantee QoS. Nevertheless, the performance of a VoLTE call may be dependent on the deployment of the LTE network, the network infrastructure of the LTE network, the process of the making the VoLTE call, coverage level at a particular geolocation, congestion level at the particular geolocation, control plane issues, and/or so forth.

In various embodiments, the core network 104 may include one or more computing devices 144 that implement a call classification engine 146 and a VoLTE diagnostic engine 148. The VoLTE diagnostic engine 148 may receive VoLTE call records 150 from the EPC 128. The VoLTE call records 150 may include performance indicators that are collected by performance monitoring software for multiple VoLTE calls. The performance monitoring software may be installed on VoLTE-compatible user devices, such as the user device 106(2). For example, the performance monitoring software may be firmware or operating system (OS) applications that are installed on the user devices by the manufacturers of the devices. The performance monitor software may collect cross-layer performance indicators on each user device, such as information on the Packet Data Units (PDUs) of the radio link layer and the TCP/IP packets of the application layer. Accordingly, the performance indicators may include user interface (UI) interaction messages, IMS message transaction data, call setting data, call state data, Real-time Transport Protocol (RTP) performance data, call handover data, and/or so forth, for multiple VoLTE calls. The VoLTE call records 150 may further contain data on the call features of multiple VoLTE calls, in which the call features may be collected by the performance monitoring software of the user devices and/or the EPC 128 of core network 104. The VoLTE call records 150 may additionally contain IMS protocol messages that are associated with each of the VoLTE calls. For example, the IMS protocol message for a successful VoLTE call may include a HTTP response code 200, indicating that a communication message was successfully acknowledged, or a 3GPP cause code 16, indicating that a communication session was terminated normally. In contrast, the IMS protocol message for an unsuccessful VoLTE call may include a SIP 503 error code, indicating that a communication service was unavailable. The IMS protocol messages for multiple VoLTE calls may be collected by the performance monitoring software of the user devices and/or the EPC 128 of core network 104. Data that are collected by the performance monitoring software of the user devices may be transmitted by the application layers of the VoLTE-compatible user device to the EPC 128 of the core network 104 via an air interface provided by the base stations. As such, the EPC 128 of the core network 104 may send the VoLTE call records 150 to the VoLTE diagnostic engine 148.

In various embodiments, each of the VoLTE call records 150 may be labeled by a call classification engine 146 as either a call record for a successful call, i.e., a VoLTE call without a QoE problem, or a call record for an unsuccessful call, i.e., a VoLTE call with a QoE problem. For an unsuccessful call, the QoE problem may be a call drop, a call setup failure, or an audio issue during the call. Accordingly, the call classification engine 146 may use the signaling messages in the VoLTE call records 150 to label each VoLTE call as either successful or unsuccessful. For example, if the call classification engine 146 encounters a protocol error message (e.g., SIP 503 error code) for a VoLTE call, the call classification engine 146 may label the corresponding VoLTE call record as belonging to an unsuccessful VoLTE call. On the other hand, if the call classification engine 146 encounters a successful protocol message (e.g., HTTP response code 200 or 3GPP cause code 16) for a VoLTE call, the call classification engine 146 may label the corresponding VoLTE call record as belonging to a successful VoLTE call.

In turn, the labeled VoLTE call records 150 are received by the VoLTE diagnostic engine 148. The VoLTE diagnostic engine 148 may use a machine-learning approach to analyze the labeled VoLTE call records 150. Such analysis of the VoLTE call records 150 enables the VoLTE diagnostic engine 148 to extract the characteristics of various QoE problems 152 that are encountered by the VoLTE-compatible user devices. The characteristics are then used by the VoLTE diagnostic engine 148 to build new QoE metrics. The critical features of each QoE metric are further determined by the VoLTE diagnostic engine 148 to diagnose the root causes 154 of the corresponding QoE problems 152. In various embodiments, the VoLTE diagnostic engine 148 may apply decision tree learning to building a prediction model for each potential failure reason type, and then use a classifier, such as a Support Vector Machine (SVM), to characterize the root causes of the QoE problems 152 that reside in the data plane. Subsequently, the VoLTE diagnostic engine 148 may generate responses for resolving the QoE problems 152 based on the identified root causes. The responses may include suggestions of measures or actions to be implemented by the wireless network operators, protocol designers, and/or device manufacturers. In various embodiments, the VoLTE call records 150 may be periodically refreshed with data on new VoLTE calls as data on old VoLTE calls are removed. In this way, the classifier of the VoLTE diagnostic engine 148 may be periodically retrained to recognize the root causes of emerging QoE problems associated with new VoLTE calls.

Example Server Components

Figure 2:
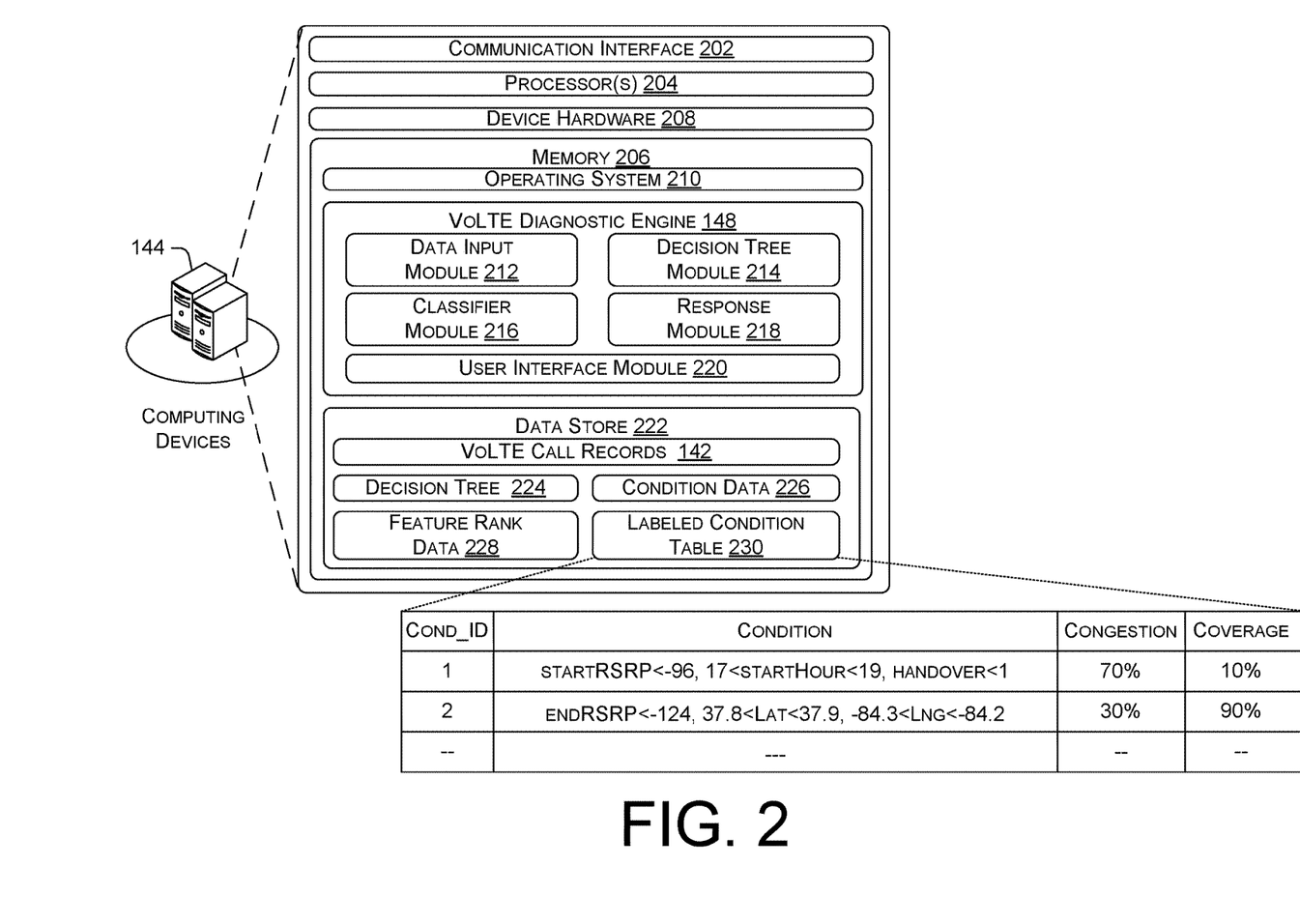
FIG. 2 is a block diagram showing various components of a VoLTE diagnostic engine that implements machine learning-based troubleshooting of VoLTE calls.

FIG. 2 is a block diagram showing various components of the VoLTE diagnostic engine 148 that implements machine learning-based troubleshooting of VoLTE calls. The VoLTE diagnostic engine 148 may be implemented on one or more computing devices 144 that are a part of the core network 104. The computing devices 144 may include general purpose computers, such as desktop computers, tablet computers, laptop computers, servers, or other electronic devices that are capable of receive inputs, process the inputs, and generate output data. In other embodiments, the computing devices 144 may be virtual computing devices in the form of virtual machines or software containers that are hosted in a cloud. The computing devices 144 may be equipped with a communication interface 202, one or more processors 204, memory 206, and device hardware 208. The communication interface 202 may include wireless and/or wired communication components that enable the computing devices to transmit data to and receive data from other networked devices via a communication network. The device hardware 208 may include additional hardware that performs user interface, data display, data communication, data storage, and/or other server functions.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 204 and the memory 206 of the computing devices 144 may implement an operating system 210 and the VoLTE diagnostic engine 148. The operating system 210 may include components that enable the computing devices 144 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The VoLTE diagnostic engine 148 may include a data input module 212, a decision tree module 214, a classifier module 216, a response module 218, and a user interface module 220. The VoLTE diagnostic engine 148 may also interact with a data store 222. These modules may include routines, program instructions, objects, and/or data structures that perform particular tasks or implement particular abstract data types.

The data input module 212 may receive the VoLTE call records 150 from the EPC 128. The VoLTE call records 150 may include performance indicators that are collected by performance monitoring software that are installed on VoLTE-compatible user devices for multiple VoLTE calls. The performance indicators may include information collected from multiple device architectural layers of the user devices, such as information on the Packet Data Units (PDUs) of the radio link layer and the TCP/IP packets of the application layer. Accordingly, the performance indicators may include user interface (UI) interaction messages, IMS message transaction data, call setting data, call state data, Real-time Transport Protocol (RTP) performance data, call handover data, and/or so forth. The performance indicators may individually or collectively in groups of two or more indicate QoE problems with one or more VoLTE calls. The collection of information from the multiple device architectural layers of each user device may enable the VoLTE diagnostic engine 148 to discover root causes of QoE problems that are otherwise not discernable. For example, the root cause of undesired audio muting of a VoLTE call may lie in the interaction between the RTP in the application layer and the Packet Data Convergence Protocol (PDCP) in the radio link layer.

The VoLTE call records 150 may further contain data on the call features of multiple VoLTE calls. A call feature of a VoLTE call is a dimension that represents the circumstance under which the VoLTE call is established and ended, in which the circumstance may include the initial Reference Signal Received Power (RSRP) of the VoLTE call, the end RSRP of the VoLTE call, the start hour of the VoLTE call, the end hour of the VoLTE call, the location where the VoLTE call is made, and/or so forth. A call condition is a subset of all call features for a VoLTE call, in which each feature of the subset has a specific range of value. For example, a specific range may be the initial RSRP of a VoLTE call being less than −96 decibel-milliwatts (dBm), the start hour of the call being between 5 p.m. and 7 p.m., or the number of handovers for the VoLTE being less than one. Accordingly, a call condition under which most VoLTE calls experience one specific QoE problem may give hints on the root cause of the problem. For example, a group of VoLTE calls may experience call drop with a SIP 503 error code under the call condition of end RSRP weaker than −124 dBm and a particular area defined by a specific set of latitude and longitude. In such an example, the call condition may indicate that the call drop is most likely due to poor signal coverage of the base stations in the particular area.

Since the number of successful VoLTE call records are much larger than the calls with QoE problems, the data input module 212 may in some instances perform down sampling of the successful VoLTE calls (i.e., calls without QoE problems) from the VoLTE call records 150. The down sampling is performed so that the down sampled successful VoLTE calls are representative of all VoLTE calls without QoE problems, and the number of these successful VoLTE calls are comparable to the number of VoLTE calls with QoE problems.

The decision tree module 214 may apply a decision tree algorithm to the VoLTE call records 150 to identify critical features of one or more conditions that lead to QoE problems for calls captured in the call records. A critical feature for a VoLTE call is a pair of feature and threshold value in a call condition that has a major impact on the QoE for the call. While a call record with a QoE problem contains one condition of interest, it is inefficient and ineffective to analyze each call record separately to understand the QoE problems. First, it is hard to justify whether one feature contributes to the QoE problem based on just one call record. For example, a highly congested base station can cause a call drop, regardless of the received signal strength on the phone. Thus, the signal strength of this call record is not a good indicator of the problem. Second, given that the number of calls with QoE problems is large in an operational LTE network, it is also impractical to look at problematic calls one by one. Since there are usually a few major conditions that lead to a specific QoE problem, aggregating call records to look for these conditions is more efficient and effective on understanding the potential root causes.

Accordingly, the decision tree module 214 uses both call records without and with QoE problems as the input to decision tree learning in order to retrieve call conditions from an output decision tree. Starting from the VoLTE call records 150, a decision tree learning algorithm may find one feature and a corresponding threshold value for the feature to divide the data samples in the VoLTE call records into two subsets. The feature and the corresponding threshold value are chosen so that at least one of the subsets has a predetermined ratio of call records with the QoE problem to call records without the QoE problem. Accordingly, the VoLTE call records are separated into the subsets according to the threshold value to create new leaf nodes for a decision tree.

Subsequently, the decision tree module 214 may determine whether separation based on the threshold value criterion lead to a smaller inequality of distribution for the pair of subsets. In various embodiments, the criterion may be quantified using a gini index and a smaller gini index is an indication of better classification. Accordingly, the decision tree algorithm may repeat the separation of each subset into a new pair of subsets per new features and corresponding threshold values until a separation no longer leads to a smaller inequality of distribution (e.g., gini index) for any new pair of subsets. The decision tree module 214 may repeat this separation for VoLTE call records associated with each QoE problem. In this way, the decision tree 224 generated by the decision tree module 214 may contain tree leaves with specific classes, in which the number of call records in each specific class is larger than in a counterpart class. The tree branch of each tree leaf is a call condition to which the corresponding call records belong, in which the call condition is a combination of multiple pairs of features and threshold values. The decision tree module 214 may store the decision tree 224 in the data store 222.

In one implementation, in order be statistically representative, the decision tree module 214 may output a decision tree in which each leaf node of the decision tree has at least a minimum number of VoLTE call records (e.g., 20 call records, 30 call records, etc.). Further, each QoE problem that is included in the QoE problems 152 is to be associated with a minimum number of call samples (e.g., 20 samples, 30 samples, etc.) so that the potential output conditions of the VoLTE diagnostic engine 148 are useful to identify the root cause of the problem.

Subsequently, the decision tree module 214 may extract decision leaf nodes related to each QoE problem and one or more corresponding call conditions related to each QoE problem from the decision tree. For example, the extraction may output two conditions for a call drop problem with SIP 503 error: (1) the initial RSRP is weaker than −96 dBm, the call starts between 5 p.m. and 7 p.m., and there is no handover, and (2) the end RSRP is weaker than 124 dBm, and the call is made in a specific area defined by a latitude and a longitude.

Since some VoLTE calls made under the same call condition may not experience any QoE problem, the decision tree module 214 may use a confidence level to indicate how certain a call condition leads to the QoE problem. A higher confidence level for a call condition means that the calls made under the call condition is more likely to experience the corresponding QoE problem. Conversely, a lower confidence level for the call condition means that the calls made under the call condition is less likely to experience the corresponding QoE problem. In various embodiments, the confidence level for a call condition is calculated as a ratio of VoLTE call records with the call condition that experienced the QoE problem to all VoLTE call records with the call condition. For example, the call condition (1) has a confidence level of 95%, while call condition (2) has a smaller confidence level of 91%. This indicates that based on all VoLTE call records, call condition (2) is less likely to be related to the QoE problem than call condition (1). The decision tree module 214 mays store condition data 226 that includes the call conditions and confidence levels in the data store 222.

After finding the call conditions leading to a QoE problem, the decision tree module 214 may analyze the importance of each feature in a call condition in order to identify the critical features of the call condition. The decision tree module 214 may perform such analysis for all call conditions encompassed in the decision tree. There may be one or more features in one condition and the impact of each feature on the call QoE can be different. For example, VoLTE calls under a call condition having a specific location and a handover may have a high call drop ratio. However, handovers may play a major role in causing the call drops, while the impact of the location on the call drops is minor. Thus, a critical feature of a call condition is a subset of feature and threshold pair in the call condition that have major impact on the call QoE.

In order to determine whether a call feature of a call condition is a critical feature for a QoE problem, the decision tree module 214 may analyze the VoLTE call records 150 to determine a first ratio of VoLTE calls with the QoE problem and having the call condition to all VoLTE calls having the call condition. Subsequently, the decision tree module 214 may analyze the VoLTE call records 150 to determine a second ratio of VoLTE calls with the QoE problem and having the call condition to all VoLTE calls having the call condition but without the call feature. A difference between the first ratio and the second ratio is then determined by the decision tree module 214, in which a larger difference indicates that the call feature is more critical in causing the QoE problem, while a smaller difference indicates that the call feature is less critical in causing the QoE problem. In some embodiments, the decision tree module 214 may be deemed a call feature that has a larger-than-zero difference of ratios as a critical feature. Once all the critical features for a call condition have been determined, the decision tree module 214 may rank the critical features for importance to the call condition based on the corresponding difference values. The decision tree module 214 mays store the feature rank data 228 for the critical features in the data store 222.

The classifier module 216 may apply a classifier on the ranked critical features of the call conditions to determine a root cause of a QoE problem for a VoLTE call that has a call condition. For a given call condition, the classifier module 216 may receive a corresponding list of one or more critical features of the call condition as ranked according to importance to causing a QoE problem, as generated by the decision tree module 214. Based on such input, the classifier module 216 may predict whether the QoE problem is more likely to be caused by a coverage issue or a congestion issue, and generate confidence values for the prediction. In various embodiments, the classifier module 216 may take a SVM learning approach to build prediction models for coverage issue and congestion issue respectively, using the domain knowledge to instruct the training phase. Domain knowledge helps to identify the dominant features behind certain issue. For example, congestion generally happens within a certain time period of a given cell, and thus the critical features for determining congestion are the cell identity and the time of day. A coverage issue may be more related to a location while being independent of the time of day, so the critical feature for determining coverage issue is the location where the call is made. In other words, if a QoE problem consistently occurs at the same location at various times throughout a time period, then the underlying issue that caused the QoE problem is most likely a coverage issue. On the other hand, if a QoE problem occurs at a location at certain times but not at other times, then the underlying issue that caused the QoE problem is most likely a congestion issue.

In such embodiments, the classifier module 216 may label a subset of the VoLTE call records 150 as having a congestion issue or a coverage issue based on the ranked lists of critical features for call conditions as generated by decision tree module 214 to generate labeled conditions. The labeled conditions are used by the classifier module 216 as a training set. Accordingly, the classifier module 216 may build a machine-learning congestion model and a machine-learning coverage model using the labeled conditions. The models are applied by the classifier module 216 to each of multiple conditions to determine a congestion confidence value for whether a call condition is associated with a congestion issue, and to determine a coverage confidence value for whether the call condition is associated with a coverage issue, in which the confidence values may be expressed as percentage values. The classifier module 216 may store the determined confidence values for all the call conditions as a labeled condition table 230 in the data store 222. For example, as shown in FIG. 2, the labeled condition table 230 is a mapping table that lists a series of different call conditions by their condition identifiers, where each call condition is labeled with a corresponding congestion confidence value and coverage confidence value. In some embodiments, the building of the models may be performed offline using historical VoLTE call records, such as call records from last week. However, the calculation of the confidence values are performed in real time following the upload of new VoLTE call records.

Subsequently, the labeled condition table 230 may be used by the classifier module 216 to propagate the congestion confidence value and the coverage confidence value to all call records of the VoLTE call records 150. Such propagation may be performed by matching call features of the unlabeled VoLTE call records without confidence values to the call conditions that are labeled with the confidence values. In this way, the root causes for the QoE problems affecting one or more VoLTE call records may be identified. For example, a call condition with an end RSRP of less than −96 dBm (first call feature), a latitude between 37.8 and 37.9 and a longitude between −84.3 and −84.2 (second call feature) may be labeled with congestion confidence value of 90%, which indicates that the underlying root cause of the QoE problem associated with the call condition is network congestion. Subsequently, the classifier module 216 may label a particular VoLTE call record with a QoE problem that exhibits the same set of call features as having a congestion confidence value of 90%, thereby indicating that the root cause of the QoE problem associated with the particular VoLTE call record is also network congestion.

Furthermore, as the VoLTE diagnostic engine 148 receives new VoLTE call records for additional VoLTE calls, the classifier module 216 may use the labeled condition table 230 to determine whether each of the VoLTE calls captured in the VoLTE call records is likely to suffer a congestion issue or a coverage issue based on the call features exhibited by each VoLTE call. In various embodiments, the classifier module 216 may compare the call condition of a new VoLTE call to the various call conditions that are listed in the labeled condition table 230. Thus, if the call condition of the new VoLTE call matches a call condition that is listed in the table, the new VoLTE call may be determined by the classifier module 216 as having the same congestion confidence value or coverage confidence value. In some instances, the VoLTE call may be inferred by the classifier module 216 as having one of such confidence values, indicating that a potential for a congestion issue or coverage issue may exist, even when the VoLTE call is a successful call that did not experience any QoE problems.

The classifier module 216 may further ascertain the locations of the VoLTE calls that are identified with having a congestion issue or a coverage issue. By measuring the number of times that each location identified, the classifier module 216 may identify a list of one or more locations that are experiencing congestion issues and/or a list of one or more locations that are experiencing coverage issues. In some instances, the classifier module 216 may be configured to generate a list of locations in which the number of unsuccessful VoLTE calls at each location exceeds a predetermined number threshold in a predetermined time period. In other instances, the classifier module 216 may be configured to ascertain the locations for VoLTE calls associated with congestion confidence values or coverage confidence values that exceed a value threshold.

The response module 218 may generate responses for resolving the QoE problems 152 associated with VoLTE call records based on the identified root causes. The responses may include suggestions of measures or actions to be implemented by the wireless network operators, protocol designers, and/or device manufacturers. In various embodiments, a response may be retrieved from a solutions database by the response module 218 based on the input root cause. For example, the response for a location that is experiencing a coverage issue may be a suggestion to deploy additional base station nodes at or near the location. In another example, the response for a location that is experiencing a congestion issue may be a suggestion to increase the data throughput capacity of the existing base station nodes at the location.

The user interface module 220 may enable an administrator to interact with the modules of the VoLTE diagnostic engine 148 via data input devices and data output devices. For example, the user interface module 220 may enable the administrator to select the type, the amount, or the source of VoLTE call records that are analyzed by the VoLTE diagnostic engine 148. In another example, the administrator may also use the user interface module 220 to select a particular type of machine-learning algorithm to apply. In other examples, the administrator may also use the user interface module 220 to input or modify the specific response to a root cause of a QoE problem, and/or so forth.

The data store 222 may store data that are used by the various modules of the VoLTE diagnostic engine 148. The data store 222 may include one or more databases, such as relational databases, object databases, object-relational databases, and/or key-value databases. In various embodiments, the data store 222 may VoLTE call records 150 that are collected from user devices (e.g., 3G-compatible user device 106(1)). The data store 222 may also store the decision tree 224, the condition data 226, the feature rank data 228, and the labeled condition table 230.

In some embodiments, the VoLTE diagnostic engine 148 may be implemented using a distributed-computing framework that distributes the analysis of the VoLTE call records 150 to multiple computing nodes. In such embodiments, a centralized cluster manager may control how each computing node executes tasks for different parts of the root cause analysis. For example, one driver program may store the context of the analysis job and distribute processing tasks to multiple worker nodes. Each worker node may have its own cache and tasks to finish, which corresponds to processing a subset of the VoLTE call records 150. The framework can may be deployed by organizing the worker nodes in a cloud service with the system scripts running on the worker nodes.

Example Processes

FIGS. 3-7 present illustrative processes 300-700 for implementing machine learning-based troubleshooting of VoLTE calls. Each of the processes 300-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-700 are described with reference to the network architecture 100 of FIG. 1.

Figure 3:
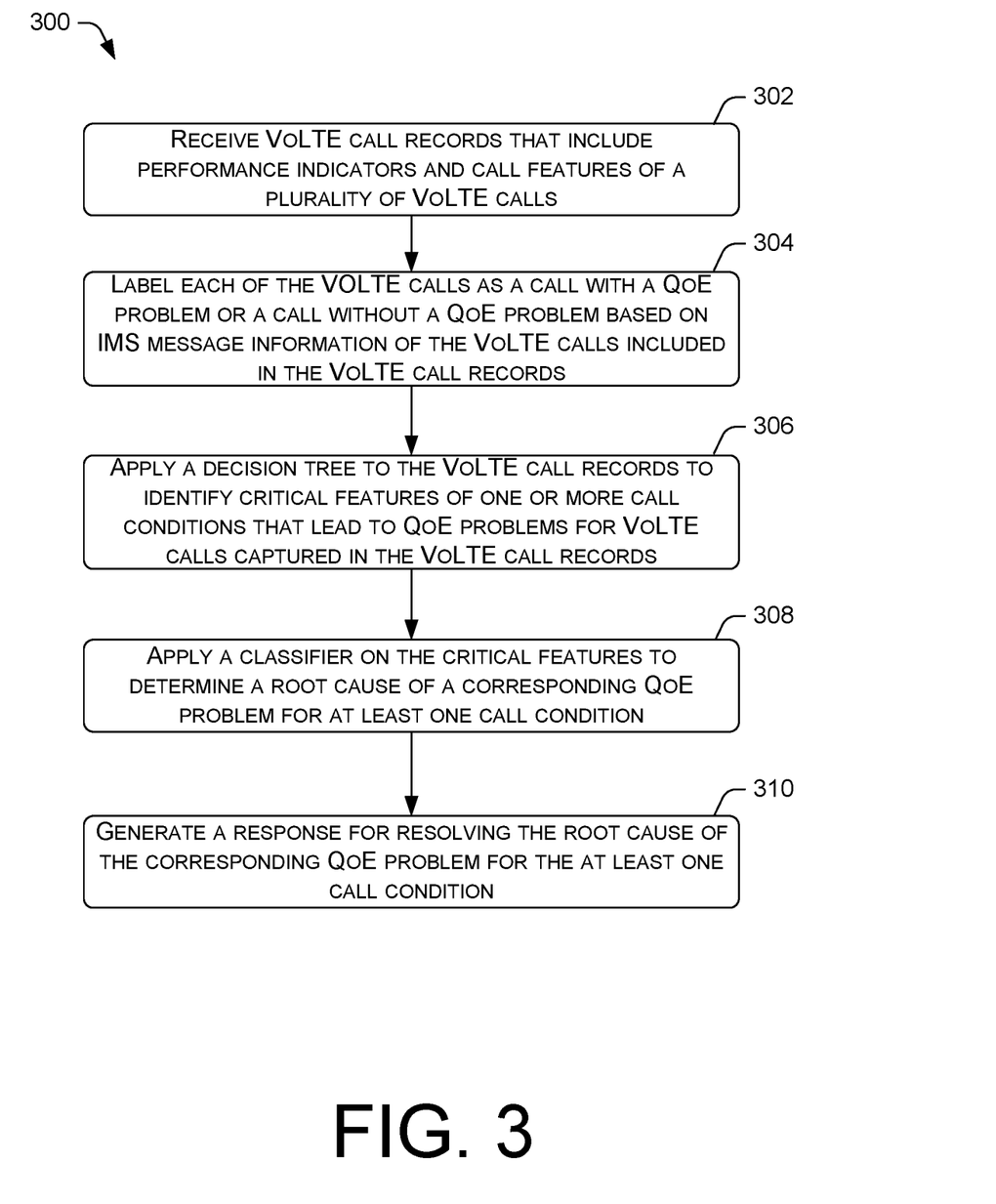
FIG. 3 is a flow diagram of an example process for determining a root cause of a QoE problem for a VoLTE call and generating a response for resolving the QoE problem.

FIG. 3 is a flow diagram of an example process 300 for determining a root cause of a QoE problem for a VoLTE call and generating a response for resolving the QoE problem. At block 302, the VoLTE diagnostic engine 148 may receive VoLTE call records 150 for a plurality of VoLTE calls that include performance indicators collected by performance monitoring software of user devices. In various embodiments, the performance indicators may include user interface (UI) interaction messages, IMS message transaction data, call setting data, call state data, Real-time Transport Protocol (RTP) performance data, call handover data, and/or so forth, for multiple VoLTE calls. The VoLTE call records 150 may further contain data on the call features of multiple VoLTE calls, in which the call features may be collected by the performance monitoring software of the user devices and/or the core network 104.

At block 304, the call classification engine 146 may label each of the VoLTE calls as a call with a QoE problem or a call without a QoE problem based on the IMS message information of the VoLTE calls included in the VoLTE call records 150. For example, the IMS protocol message for a successful VoLTE call (without a QoE problem) may include a HTTP response code 200, indicating that a communication message was successfully acknowledged, or a 3GPP cause code 16 indicating that a communication session was terminated normally. In contrast, the IMS protocol message for an unsuccessful VoLTE call (with a QoE problem) may include a SIP 503 error code, indicating that a communication service was unavailable.

At block 306, the VoLTE diagnostic engine 148 may apply a decision tree to the VoLTE call records 150 to identify critical features of one or more call conditions that lead to QoE problems for the VoLTE calls captured in the VoLTE call records. In various embodiments, a call feature of a VoLTE call is a dimension that represents the circumstance under which the VoLTE call is established and ended. A call condition is a subset of all features for a VoLTE call, in which each feature of the subset has a specific range of value. Furthermore, a critical feature for a VoLTE call is a pair of feature and threshold value in a call condition that has a major impact on the QoE for the call.

At block 308, the VoLTE diagnostic engine 148 may apply a classifier on the critical features to determine a root cause of a corresponding QoE problem for at least one call condition. In various embodiments, the classifier may be a SVM that is used to build prediction models for coverage issue and congestion issue respectively. The prediction models are further used to label a QoE problem of the individual VoLTE calls as either a coverage issue or a congestion issue based on the call features of the call condition.

At block 310, the VoLTE diagnostic engine 148 may generate a response for resolving a root cause of the corresponding QoE problem for the at least one condition. The response may include suggestions of measures or actions to be implemented by the wireless network operators, protocol designers, and/or device manufacturers. In various embodiments, the response may be retrieved from a solutions database by the VoLTE diagnostic engine 148 based on the root cause.

Figure 4:
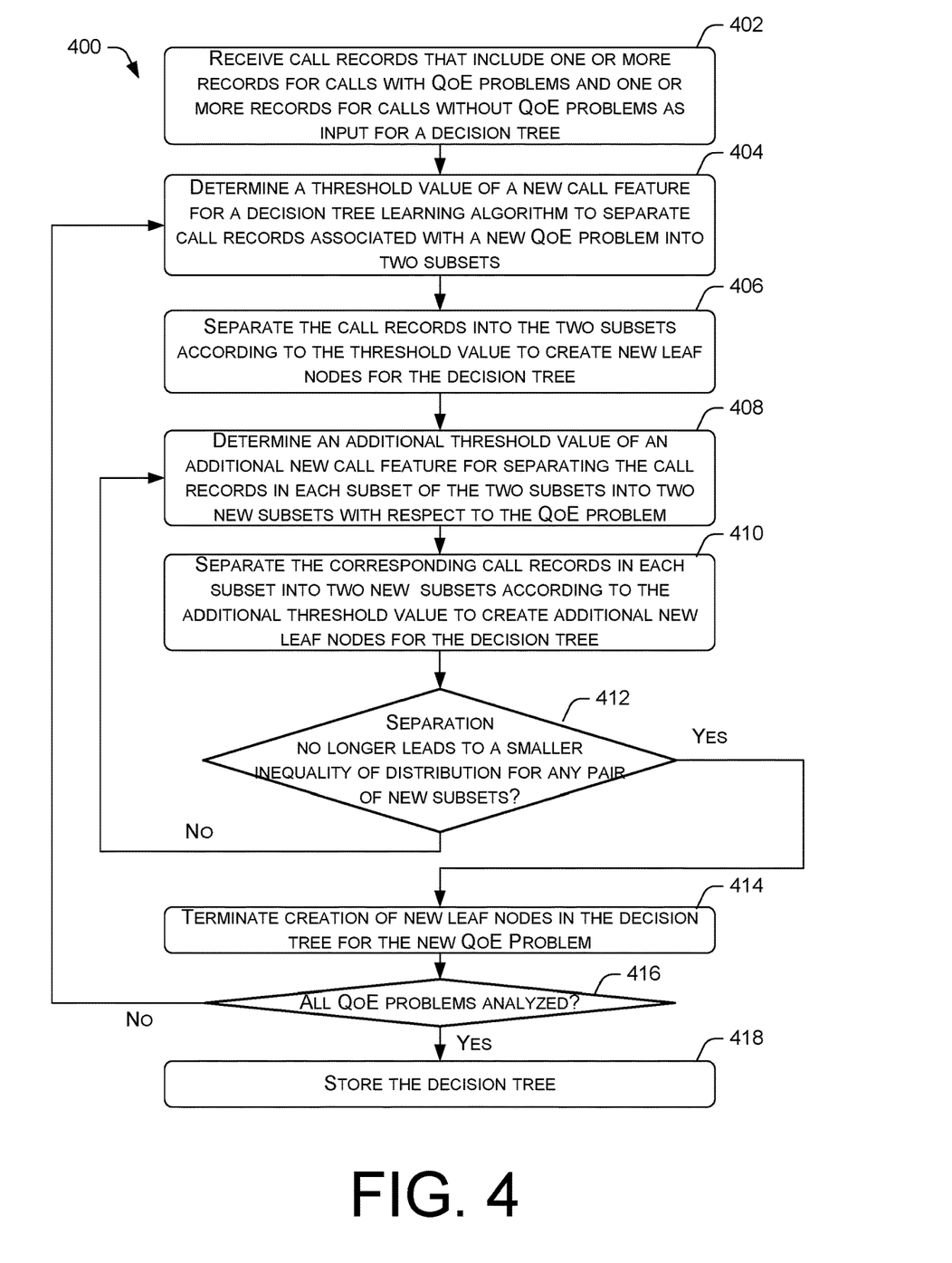
FIG. 4 is a flow diagram of an example process for generating a decision tree for determining call conditions that cause QoE problems for VoLTE calls.

FIG. 4 is a flow diagram of an example process 400 for generating a decision tree for determining call conditions that cause QoE problems for VoLTE calls. The example process 400 further describes block 304 of the example process 300. At block 402, the VoLTE diagnostic engine 148 may receive VoLTE call records 150 that include one or more records for VoLTE calls with QoE problems and one or more records for VoLTE without QoE problems as input for a decision tree. In some embodiments, down sampling of the successful VoLTE calls (i.e., VoLTE calls without QoE problems) from the VoLTE call records 150. The down sampling may be performed so that the down sampled successful VoLTE calls are representative of all VoLTE calls without QoE problems, and the number of these successful VOLTE calls are comparable to the number of VoLTE calls with QoE problems.

At block 404, the VoLTE diagnostic engine 148 may determine a threshold value of a new call feature of multiple call features for a decision tree learning algorithm to separate the VoLTE call records into two subsets with respect to a QoE problem. The multiple call features belong to the calls of the VoLTE call records 150. In various embodiments, the call feature and the corresponding threshold value are chosen so that at least one of the subsets has a predetermined ratio of call records with the QoE problem to call records without the QoE problem. At block 406, the VoLTE diagnostic engine 148 may separate the VoLTE call records into the two subsets according to the threshold value to create new leaf nodes for the decision tree. In various embodiments, the distribution of the VoLTE call records into the two subsets may be quantified using an inequality of distribution measurement, such as a gini index.

At block 408, the VoLTE diagnostic engine 148 may determine an additional threshold value for an additional new call feature of the multiple call features for separating the corresponding call records in each subset of the two subsets into two new subsets with respect to the QoE problem. In various embodiments, the additional feature and the new corresponding threshold value are chosen so that at least one of the new subsets has a predetermined ratio of call records with the QoE problem to call records without the QoE problem. At block 410, the VoLTE diagnostic engine 148 may separate the corresponding VoLTE call records in each subset into the two new subsets according to the threshold value to create additional new leaf nodes for the decision tree. In various embodiments, the distribution of the VoLTE call records into the two subsets may be quantified using an inequality of distribution measurement, such as a gini index.

At decision block 412, the VoLTE diagnostic engine 148 may determine whether the separation based on the threshold value of the call feature leads to a smaller inequality of distribution measurement (e.g., gini index) for the two new subsets. Accordingly, if VoLTE diagnostic engine 148 determines that the separation does lead to a smaller inequality of distribution for a pair of new subsets ("no" at decision block 412), the process 400 may loop back to block 408, so that the another threshold value and of another new call feature may be used to further separate the VoLTE call records in the sub sets.

However, if the VoLTE diagnostic engine 148 determines that the separation no longer leads to a smaller inequality of distribution for any pair of new subsets ("yes" at decision block 412), the process 400 may proceed to block 414. At block 414, the VoLTE diagnostic engine 148 may terminate the creation of new leaf nodes in the decision tree for the new QoE problem.

At decision block 416, the VoLTE diagnostic engine 148 may determine whether all QoE problems are analyzed. Accordingly, if not all QoE problems are analyzed ("no" at decision block 416), the process 400 may loop back to block 404, so that the decision tree algorithm may be applied to separate the VoLTE call records 150 with respect to another QoE problem. However, if all QoE problems are analyzed ("yes" at decision block 416), the process 400 may proceed to block 418. At block 418, the VoLTE diagnostic engine 148 may store the decision tree in a data store.

Figure 5:
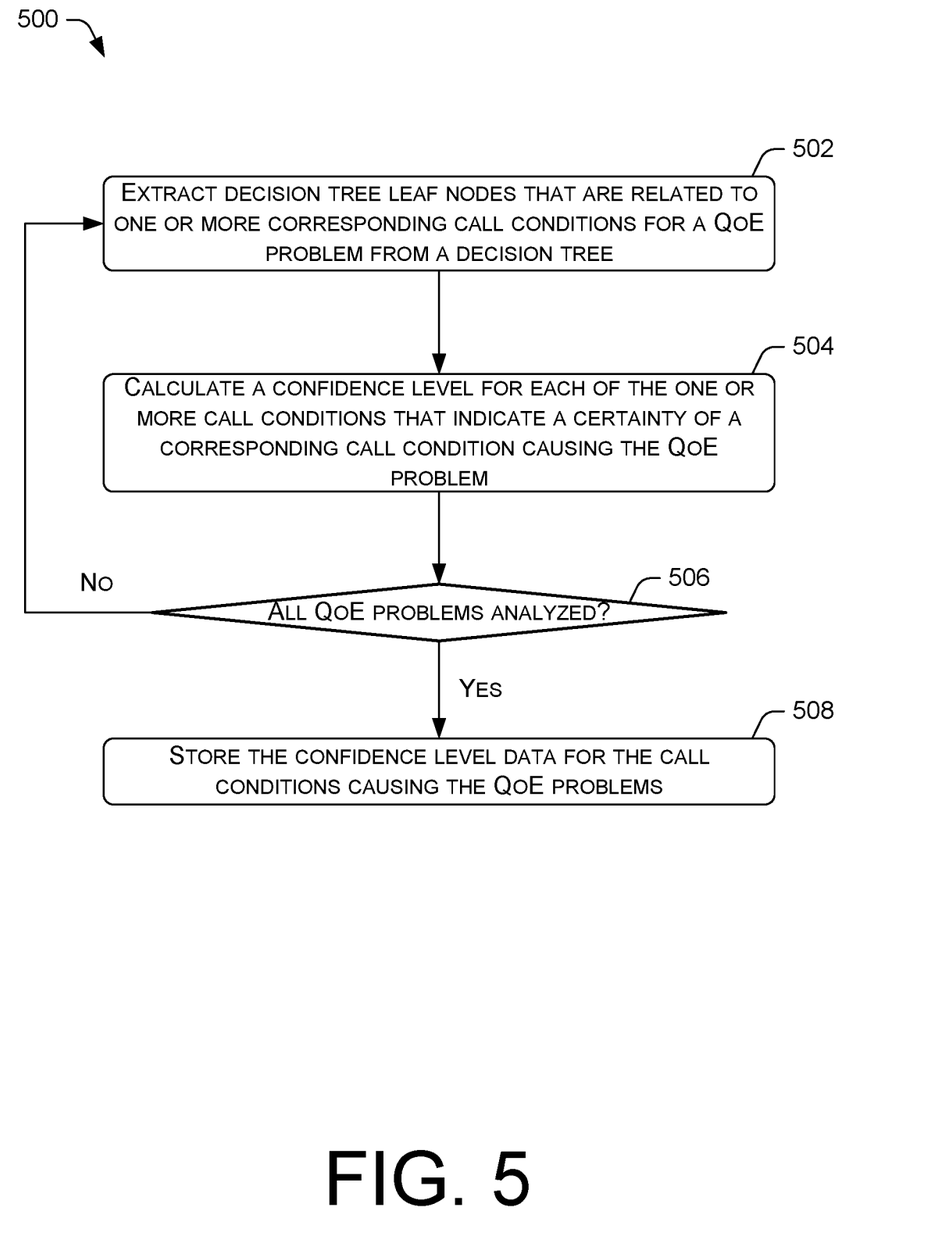
FIG. 5 is a flow diagram of an example process for applying a decision tree to multiple call records to determine call conditions that cause QoE problems for VoLTE calls.

FIG. 5 is a flow diagram of an example process 500 for applying a decision tree to multiple call records to determine conditions that cause QoE problems for VoLTE calls. The example process 500 further describe block 304 of the example process 300, and may occur following the process 400. At block 502, the VoLTE diagnostic engine 148 may extract decision tree leaf nodes that are related to one or more corresponding call conditions for a QoE from a decision tree. At block 504, the VoLTE diagnostic engine 148 may calculate a confidence level for each of the one or more call conditions that indicate a certainty of a corresponding condition causing the QoE problem. In various embodiments, the confidence level for a call condition is calculated as a ratio of VoLTE call records with the call condition that experienced the QoE problem to all VoLTE call records with the call condition. A higher confidence level for a call condition means that the calls made under the call condition is more likely to experience the corresponding QoE problem. Conversely, a lower confidence level for the call condition means that the calls made under the call condition is less likely to experience the corresponding QoE problem.

At decision block 506, the VoLTE diagnostic engine 148 may determine whether all QoE problems are analyzed. Accordingly, if not all QoE problems are analyzed ("no" at decision block 506), the process 500 may loop back to block 502 so that confidence values for conditions causing another QoE problem may be analyzed. However, if all QoE problems are analyzed ("yes" at decision block 506), the process 500 may proceed to block 508. At block 508, the VoLTE diagnostic engine 148 may store the confidence level data for the call conditions causing the QoE problems in a data store.

Figure 6:
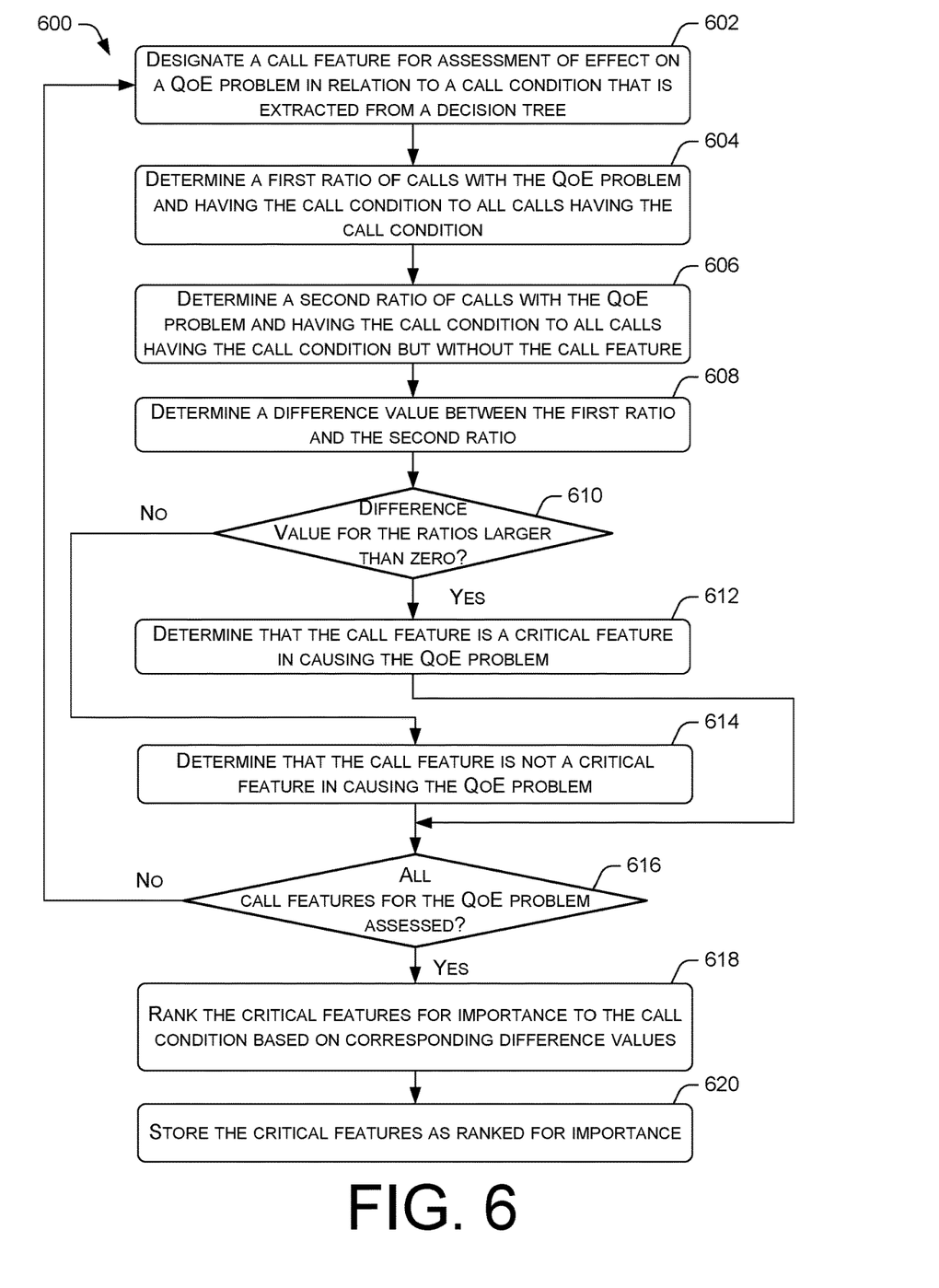
FIG. 6 is a flow diagram of an example process for analyzing a decision tree to obtain critical call features of call conditions that contribute to QoE problems for VoLTE calls.

FIG. 6 is a flow diagram of an example process 600 for analyzing a decision tree to obtain critical call features of call conditions that contribute to QoE problems for VoLTE calls. The example process 600 further describes block 304 of the example process 400, and may occur following the process 500. At block 602, the VoLTE diagnostic engine 148 may designate a call feature for assessment of effect on a QoE problem in relation to a call condition that is extracted from a decision tree.

At block 604, the VoLTE diagnostic engine 148 may determine a first ratio of VoLTE calls with the QoE problem and having the call condition to all VoLTE calls having the call condition. At block 606, the VoLTE diagnostic engine 148 may determine a second ratio of VoLTE calls with the QoE problem and having the call condition to all VoLTE calls having the call condition but without the call feature.

At block 608, the VoLTE diagnostic engine 148 may determine a difference value between the first ratio and the second ratio. At decision block 610, the VoLTE diagnostic engine 148 may determine whether the difference value for the first ratio to the second ratio is larger than zero. Thus, if the difference value is larger than zero ("yes" at decision block 610), the process 600 may proceed to block 612. At block 612, the VoLTE diagnostic engine 148 may determine that the call feature is a critical feature in causing the QoE problem. Subsequently, the process 600 may proceed to decision block 616. Returning to decision block 610, if the difference value is not larger than zero ("no" at decision block 610), the process 600 may proceed to block 614. At block 614, the VoLTE diagnostic engine 148 may determine that the call feature is not a critical feature in causing the QoE problem. Subsequently, the process 600 may proceed to decision block 616.

At decision block 616, the VoLTE diagnostic engine 148 may determine whether all call features for the QoE are assessed. Thus, if not all call features for the QoE problem are assessed ("no" at decision block 616), the process 600 may loop back to block 602 so that another call feature may be designated for assessment. However, if all call features for the QoE problem are assessed ("yes" at decision block 616), the process 600 may proceed to block 618.

At block 618, the VoLTE diagnostic engine 148 may rank the critical features for importance to the call condition based on corresponding difference values of the critical features. In various embodiments, a larger difference indicates that a call feature is more critical in causing the QoE problem, while a smaller difference indicates that the call feature is less critical in causing the QoE problem. At block 620, the VoLTE diagnostic engine 148 may store a list of the critical features as ranked in a data store.

Figure 7:
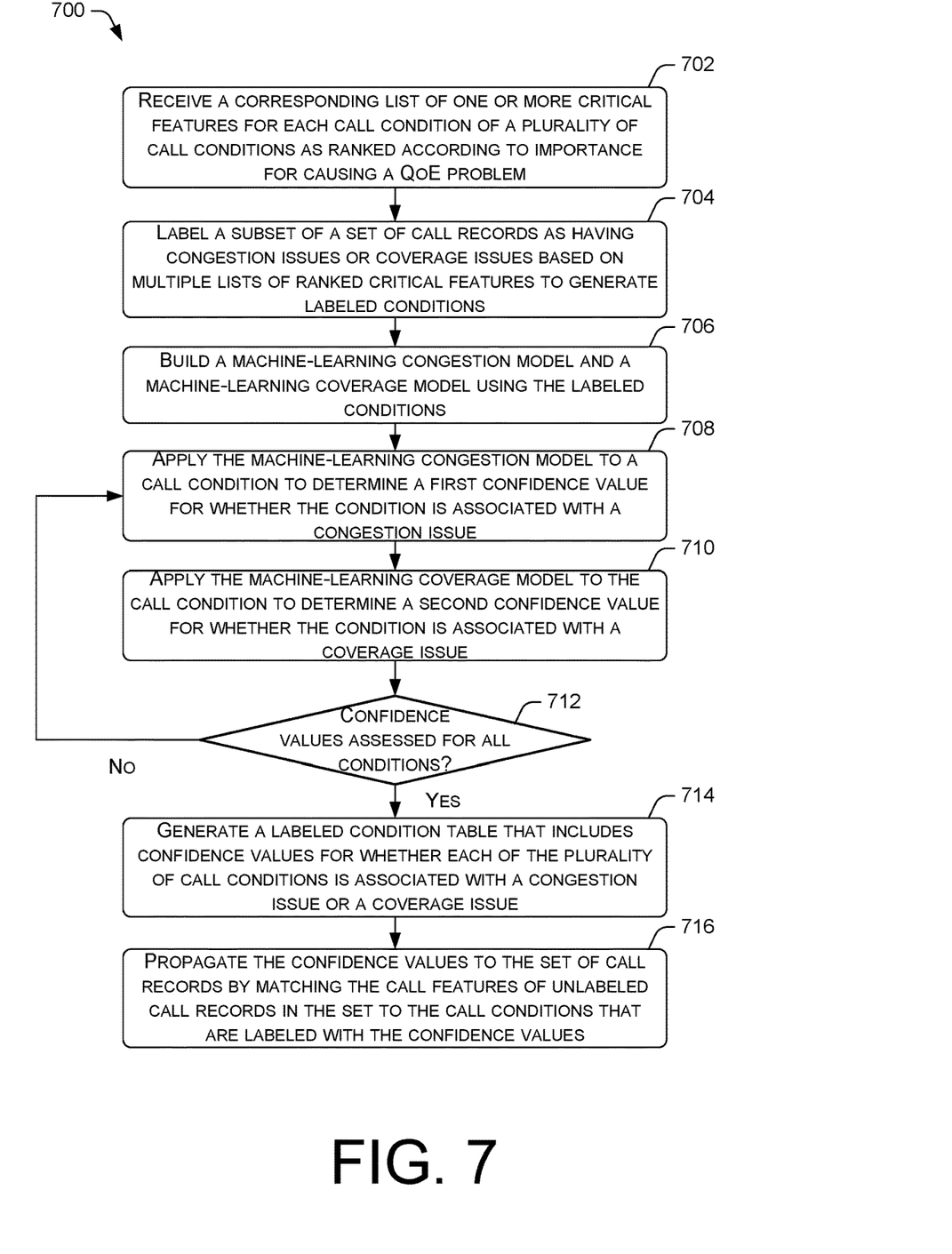
FIG. 7 is a flow diagram of an example process for using ranked critical features of call conditions to train prediction models, and using the prediction models to determine whether a call condition that causes QoE problems for VoLTE calls is associated with a congestion issue or a coverage issue.

FIG. 7 is a flow diagram of an example process 700 for using ranked critical features of call conditions to train prediction models, and using the prediction models to determine whether a call condition that causes QoE problems for VoLTE calls is associated with a congestion issue or a coverage issue. The example process 700 further describes block 306 of the example process 300. At block 702, the VoLTE diagnostic engine 148 may receive a corresponding list of one or more critical features for each call condition of a plurality of call conditions as ranked according to importance for causing a QoE problem.

At block 704, the VoLTE diagnostic engine 148 may label a subset of a set of VoLTE call records, such as the VoLTE call records 150, as having congestion issues or coverage issues based on multiple lists of ranked critical features to generate labeled conditions. The labeled conditions are used by the VoLTE diagnostic engine 148 as a training set.

At block 706, the VoLTE diagnostic engine 148 may build a machine-learning congestion model and a machine-learning coverage model using the labeled conditions. In various embodiments, the VoLTE diagnostic engine 148 may take a SVM learning approach to build the models. At block 708, the VoLTE diagnostic engine 148 may apply the machine-learning congestion model to a call condition to determine a first confidence value for whether the call condition is associated with a congestion issue, in which the confidence value may be expressed as a percentage value.

At block 710, the VoLTE diagnostic engine 148 may apply the machine-learning coverage model to the call condition to determine a second confidence value for whether the call condition is associated with a coverage issue, in which the confidence value may be expressed as a percentage value. At decision block 712, the VoLTE diagnostic engine 148 may determine whether confidence values are assessed for all conditions. Thus, if the confidence values are not assessed for all conditions ("no" at decision block 712), the process 700 may loop back to block 708 so that confidence values for another condition may be determined. However, if the confidence values are assessed for all conditions ("yes" at decision block 712), the process 700 may proceed to block 714.

At block 714, the VoLTE diagnostic engine 148 may generate a labeled condition table that includes confidence values for whether each of the plurality of call conditions is associated with a congestion issue or a coverage issue. The labeled condition table may be stored by the VoLTE diagnostic engine 148 in a data store. At block 716, the VoLTE diagnostic engine 148 may propagate the confidence values in the labeled condition table to the set of VoLTE call records by matching features of unlabeled VoLTE call records without confidence values in the set to the call conditions that are labeled with the confidence values. Such propagation may enable the VoLTE diagnostic engine 148 to indicate whether a root cause of a QoE problem for a VoLTE call record in the set of VoLTE call records is a congestion issue or a coverage issue. In some embodiments, similar propagation may be performed for new VoLTE call records to determine the root cause of the QoE problems for the VoLTE calls captured in the new VoLTE call records.

The ability to efficiently pinpoint root causes of QoE problems for VoLTE calls using machine-learning tools may enable the telecommunication carrier to remedy the QoE problems before the QoE problems become more disruptive or widespread. Thus, the techniques may alleviate expenses incurred by customer support centers in taking in outage reports, as well as reduce technical troubleshooting time and complexity experienced by network engineers.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:

receiving Voice over LTE (VoLTE) call records of VoLTE calls that are carried by a wireless carrier network for multiple user devices, the VoLTE call records including internet protocol (IP) multimedia subsystem (IMS) messages, performance indicators, and call features for the voice calls, each call feature of a VoLTE call representing a circumstance under which the VoLTE call is established and ended;

labeling each of the VoLTE calls as a call with a Quality of Experience (QoE) problem or a call without a QoE problem based on IMS message information of the VoLTE calls included in the VoLTE call records;

applying a decision tree to the VoLTE call records to identify critical features of one or more call conditions that lead to QoE problems for the VoLTE calls captured in the VoLTE call records, each call condition including a subset of the call features, wherein applying the decision tree to the VoLTE call records includes:

designating a first call feature of the subset of call features included in a corresponding first call condition to assess an effect of the first call feature on the QoE problem;

determining a first number of the VoLTE calls that experienced the QoE problem and were made with the first call condition;

determining a second total number of the VoLTE calls that were made with the first call condition;

determining a third total number of the VoLTE calls that were made with the first call condition but without the first call feature;

determining that the first call feature is a critical feature in causing the QoE problem in response to a difference between a first ratio and a second ratio being larger than zero, wherein the first ratio is a ratio between the first number and the second total number, and wherein the second ratio is a ratio between the first number and the third total number; and applying a classifier on the critical features to determine a root cause of a corresponding QoE problem for at least one call condition.

2. The one or more non-transitory computer-readable media of claim 1, wherein the acts further comprise generating a response for resolving the root cause of the corresponding QoE problem for the at least one call condition.

3. The one or more non-transitory computer-readable media of claim 2, wherein the response includes a suggestion of a measure or action to be implemented by one or more of a wireless network operator, a protocol designer, or a device manufacturer.

4. The one or more non-transitory computer-readable media of claim 1, wherein the performance indicators are collected by performance monitoring software on the user devices, the performance indicators including one or more of user interface (UI) interaction messages, IMS message transaction data, call setting data, call state data, Real-time Transport Protocol (RTP) performance data, or call handover data.

5. The one or more non-transitory computer-readable media of claim 1, wherein the performance indicators include information collected from multiple device architectural layers of a user device, the information including Packet Data Units (PDUs) of a radio link layer and TCP/IP packets of an application layer.

6. The one or more non-transitory computer-readable media of claim 1, wherein the call features for a VoLTE call includes one or more of an initial Reference Signal Received Power (RSRP) of the VoLTE call, an end RSRP of the VoLTE call, a start hour of the VoLTE call, an end hour of the VoLTE call, or a location where the VoLTE call is made.

7. The one or more non-transitory computer-readable media of claim 1, wherein the QoE problems include a high unintended call drop rate, an unintentional call muting, or a call connect failure.

8. The one or more non-transitory computer-readable media of claim 1, wherein the applying the decision tree to the VoLTE call records includes:

receiving the VoLTE call records that include one or more records for VoLTE calls with the QoE problems and one or more records for VoLTE calls without QoE problems as input for the decision tree;

determining a threshold value of a new call feature of the call features for a decision tree learning algorithm to separate the VoLTE call records associated with a new QoE problem into two subsets;

separating the VoLTE call records into the two subsets according to the threshold value to create new leaf nodes for the decision tree;

determining an additional threshold value of an additional new call features of the call features for the decision learning algorithm to separate corresponding VoLTE call records in each subset of the two subsets into two new subsets with respect to the QoE problem;

separating the corresponding VoLTE call records in each subset into two new subsets according to the additional threshold value to create additional leaf nodes for the decision tree;

repeating the determining of the additional threshold and the separating the corresponding VoLTE call records in each subset in response to a separation of the corresponding VoLTE call records in each subset leading to a smaller inequality of distribution for a pair of new subsets; and terminating creation of new leaf nodes in the decision tree for the QoE problem in response to the separation of the corresponding VoLTE call records in each subset no longer leading to a smaller inequality of distribution for any pair of new subsets.

9. The one or more non-transitory computer-readable media of claim 8, wherein the inequality of distribution is measured via a gini index.

10. The one or more non-transitory computer-readable media of claim 8, wherein the applying the decision tree to the VoLTE call records further includes:

extracting decision tree leaf nodes that related to one or more corresponding call conditions for a QoE problem from the decision tree; and calculating a confidence level for each of the one or more call conditions that indicate a certainty of a corresponding call condition causing the QoE problem.

11. The one or more non-transitory computer-readable media of claim 8, wherein the VoLTE calls without the QoE problems are down sampled to a number that is comparable to a number of VoLTE calls with QoE problems.

12. The one or more non-transitory computer-readable media of claim 1, wherein the applying the decision tree to the VoLTE call records includes:

determining that the first call feature is not a critical feature in causing the QoE problem in response to the difference between the first ratio and the second ratio not being larger than zero.

13. The one or more non-transitory computer-readable media of claim 12, wherein the applying the decision tree to the VoLTE call records further includes ranking a plurality of critical features for importance to the call condition based on corresponding difference values of the plurality of critical features, the plurality of features including the critical feature and one or more other critical features.

14. The one or more non-transitory computer-readable media of claim 1, wherein the applying the classifier on the critical features includes:

receiving multiple lists of critical features that includes a corresponding list of one or more critical features for each call condition of a plurality of call conditions as ranked according to importance for causing a QoE problem;

labeling a subset of the VoLTE call records as having congestion issues or coverage issues based on the multiple lists of critical features to generate labeled conditions;

building a machine-learning congestion model and a machine-learning coverage model using the labeled conditions;

applying the machine-learning congestion model to each of multiple call conditions to determine confidence values for whether the multiple call conditions are associated with a congestion issue;

applying the machine-learning coverage model each of the multiple call conditions to determine confidence values for whether the multiple call conditions are associated with a coverage issue;

generating a labeled condition table that includes confidence values for whether each of the plurality of call conditions is associated with a congestion issue or a coverage issue; and propagating the confidence values to the VoLTE call records by matching call features of unlabeled call records in the VoLTE call records to the call conditions that are labeled with the confidence values for indicating whether a root cause of a QoE problem in a VoLTE call record is a congestion issue or a coverage issue.

15. The one or more non-transitory computer-readable media of claim 14, wherein the building the machine-learning congestion model or the building the machine-learning coverage model includes using a Support Vector Machine (SVM) learning approach to build a prediction model based on the labeled conditions.

16. A system, comprising:
one or more processors; and
memory having instructions stored therein, the instructions, when executed by the one or more processors, cause the one or more processors to perform acts comprising:
receiving Voice over LTE (VoLTE) call records of VoLTE calls that are carried by a wireless carrier network for multiple user devices, the VoLTE call records including performance indicators and call features for the voice calls, each call feature of a VoLTE call representing a circumstance under which the VoLTE call is established and ended, the VoLTE calls including calls with Quality of Experience (QoE) problems and calls without QoE problems; and applying a decision tree to the VoLTE call records to identify critical features of one or more call conditions that lead to QoE problems for the VoLTE calls captured in the VoLTE call records, each call condition including a subset of the call features, wherein the applying the decision tree to the VoLTE call records includes:

designating a first call feature of the subset of call features included in a corresponding call condition to assess an effect of the first call feature on the QoE problem;

determining a first number of the VoLTE calls that experienced the QoE problem and were made with the call condition;

determining a second total number of the VoLTE calls that were made with the call condition;

determining a third total number of the VoLTE calls that were made with the call condition but without the first call feature;

determining that the first call feature is a critical feature in causing the QoE problem in response to a difference between a first ratio and a second ratio being larger than zero, wherein the first ratio is a ratio between the first number and the second total number, and wherein the second ratio is a ratio between the first number and the third total number;

applying a classifier on the critical features to determine a root cause of a corresponding QoE problem for at least one call condition; and generating a response for resolving the root cause of the corresponding QoE problem for the at least one call condition, the response including a suggestion of a measure or action to be implemented by one or more of a wireless network operator, a protocol designer, or a device manufacturer.

17. The system of claim 16, wherein the applying the decision tree to the VoLTE call records includes:
receiving the VoLTE call records that include one or more records for VoLTE calls with the QoE problems and one or more records for VoLTE calls without QoE problems as input for the decision tree;
determining a threshold value of a new call feature of the call features for a decision tree learning algorithm to separate the VoLTE call records associated with a new QoE problem into two subsets;
separating the VoLTE call records into the two subsets according to the threshold value to create new leaf nodes for the decision tree;
determining an additional threshold value of an additional new call features of the call features for the decision learning algorithm to separate corresponding VoLTE call records in each subset of the two subsets into two new subsets with respect to the QoE problem;
separating the corresponding VoLTE call records in each subset into two new subsets according to the additional threshold value to create additional leaf nodes for the decision tree;
repeating the determining of the additional threshold and the separating the corresponding VoLTE call records in each subset in response to a separation of the corresponding VoLTE call records in each subset leading to a smaller inequality of distribution for a pair of new subsets; and
terminating creation of new leaf nodes in the decision tree for the QoE problem in response to the separation of the corresponding VoLTE call records in each subset no longer leading to a smaller inequality of distribution for any pair of new subsets.

18. The system of claim 16, wherein the applying the decision tree to the VoLTE call records further includes:
extracting decision tree leaf nodes that related to one or more corresponding call conditions for a QoE problem from the decision tree;
calculating a confidence level for each of the one or more call conditions that indicate a certainty of a corresponding call condition causing the QoE problem;
determining that the first call feature is not a critical feature in causing the QoE problem in response to the difference between the first ratio and the second ratio not being larger than zero; and
ranking a plurality of critical features that include the critical feature and one or more other critical features for importance to the call condition based on corresponding difference values of the plurality of critical features.

19. The system of claim 16, wherein the applying the classifier on the critical features includes:
   receiving multiple lists of critical features that includes a corresponding list of one or more critical features for each call condition of a plurality of call conditions as ranked according to importance for causing a QoE problem;
   labeling a subset of the VoLTE call records as having congestion issues or coverage issues based on the multiple lists of critical features to generate labeled conditions;
   building a machine-learning congestion model and a machine-learning coverage model using the labeled conditions;
   applying the machine-learning congestion model to each of multiple call conditions to determine confidence values for whether the multiple call conditions are associated with a congestion issue;
   applying the machine-learning coverage model each of the multiple call conditions to determine confidence values for whether the multiple call conditions are associated with a coverage issue;
   generate a labeled condition table that includes confidence values for whether each of the plurality of call conditions is associated with a congestion issue or a coverage issue; and
   propagating the confidence values to the VoLTE call records by matching call features of unlabeled call records in the VoLTE call records to the call conditions that are labeled with the confidence values for indicating whether a root cause of a QoE problem in a VoLTE call record is a congestion issue or a coverage issue.

20. A computer-implemented method, comprising:
   receiving, at one or more computing devices, Voice over LTE (VoLTE) call records of VoLTE calls that are carried by a wireless carrier network for multiple user devices, the VoLTE call records including performance indicators and call features for the voice calls, the performance indicators collected by performance monitoring software on the user devices, the performance indicators including information collected from multiple device architectural layers of a user device that include a radio link layer and an application layer, and each call feature of a VoLTE call representing a circumstance under which the VoLTE call is established and ended;
   labeling each of the VoLTE calls as a call with a Quality of Experience (QoE) problem or a call without a QoE problem based on internet protocol (IP) multimedia subsystem (IMS) message information of the VoLTE calls included in the VoLTE call records;
   applying, at the one or more computing devices, a decision tree to the VoLTE call records to identify critical features of one or more call conditions that lead to QoE problems for the VoLTE calls captured in the VoLTE call records, each call condition including a subset of the call features, wherein applying the decision tree to the VoLTE call records includes:
      designating a first call feature of the subset of call features included in a corresponding call condition to assess an effect of the first call feature on the QoE problem;
      determining a first number of the VoLTE calls that experienced the QoE problem and were made with the call condition;
      determining a second total number of the VoLTE calls that were made with the call condition;
      determining a third total number of the VoLTE calls that were made with the call condition but without the first call feature;
      determining that the first call feature is a critical feature in causing the QoE problem in response to a difference between a first ratio and a second ratio being larger than zero, wherein the first ratio is a ratio between the first number and the second total number, and wherein the second ratio is a ratio between the first number and the third total number;
   applying a classifier on the critical features to determine a root cause of a corresponding QoE problem for at least one call condition; and
   generating a response for resolving the root cause of the corresponding QoE problem for the at least one call condition, the response including a suggestion of a measure or action to be implemented by one or more of a wireless network operator, a protocol designer, or a device manufacturer.

* * * * *